July 14, 1959     H. W. CLAY     2,894,550
HAMMER
Filed June 19, 1957
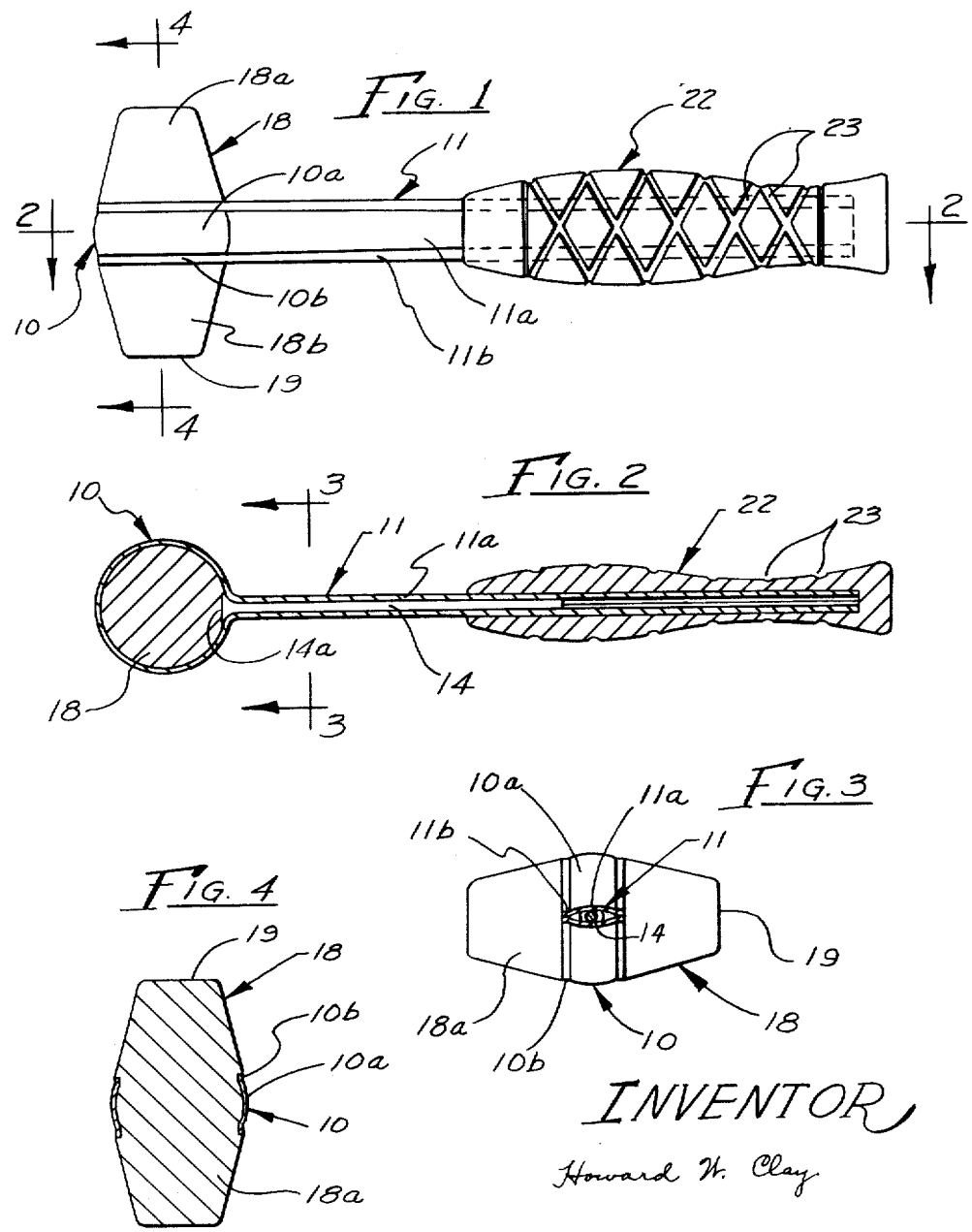
INVENTOR
Howard W. Clay
BY McCanna, Morsbach & Pillote
ATTY'S.

United States Patent Office 2,894,550
Patented July 14, 1959

2,894,550

HAMMER

Howard W. Clay, Rockford, Ill., assignor to
John R. Sassaman, Rockford, Ill.

Application June 19, 1957, Serial No. 666,522

3 Claims. (Cl. 145—36)

This invention relates to hammers and particularly to improvements in soft-headed hammers.

Various objects of this invention are to provide a soft-headed hammer which is of simple construction and which may be fabricated at a low cost; which has a metal ring surrounding the soft metal head to inhibit deformation of the head during use, and which is rugged and durable in use.

A more particular object of this invention is to provide a soft metal hammer construction including a metal member bent intermediate the ends thereof to form a ring for receiving the soft metal head and having integral shank portions extending from the ring and a metal grip molded onto the shank portions to retain the latter in abutting face-to-face relation.

Still another object of this invention is to provide a soft metal hammer construction, in accordance with the foregoing object, in which the shank portions have a longitudinally channeled configuration to rigidify the shank and in which a rod is welded to the ring and extends into the cavity formed between the channel shaped shank portions to strengthen the latter and inhibit deformation of the shank portions during use.

These, together with various ancillary objects and advantages of this invention will be more readily appreciated as the same becomes better understood by reference to the following detailed description and when taken in connection with the accompanying drawings wherein:

Figure 1 is a side elevational view of the hammer;

Figure 2 is a longitudinal sectional view taken on the plane 2—2 of Figure 1;

Figure 3 is a transverse sectional view taken on the plane 3—3 of Figure 2; and

Figure 4 is a sectional view through the soft metal head, taken on the plane 4—4 of Figure 1.

The hammer is formed from an elongated strap of metal which is bent intermediate the ends thereof to form a ring 10 and radially extending strips 11 which form the shank portion of the tool. The strap is channeled throughout its length and, as best shown in Figures 1 and 4, the ring 10 has a transversely arched intermediate portion 10a and generally cylindrical side portions 10b on each edge of the arched intermediate portion. The concave side of the arched intermediate portion 10a faces inwardly, as is clearly shown in Figure 4. The strips 11 which form the shank portion of the tool are similarly formed with a transversely arched intermediate portion 11a defining oppositely facing channels, as is shown in Figure 3, and flat side portions 11b along opposite side edges of the arched intermediate portion 11a. The side portions 11b are arranged to be disposed in abutting face-to-face contact and the arched intermediate portions 11a define a cavity therebetween which extends longitudinally of the shank.

The ring 10 is preferably welded as indicated at 14a adjacent the juncture of the ring with the strips 11, and a rod 14 is interposed in the cavity between the arched intermediate portions 11a of the strips 11 and is welded to the ring 10. The rod 14, as shown in Figures 2 and 3, is dimensioned to be snugly received between the arched portions 11a of the strips 11 and extends from a point adjacent the head to a point intermediate the ends of the hand grip to rigidify the shank portion of the tool and inhibit deformation thereof. As is apparent, if a blow were struck on the side of the shank during use of the hammer, the arched intermediate portion 11a would tend to flatten and thereby weaken the shank of the tool and also change the angle between the head and the handle of the tool. The provision of the rod 14 within the shank aids in preventing this deformation of the shank.

The soft metal head 18 is molded onto the ring 10 and completely fills the space within the transversely arched intermediate portion 10a, to thereby lock the head against displacement relative to the ring. The head tapers in both directions from the ring to form frusto-conical nose portions 18a which terminate in flat striking faces 19. In use, the repeated blows on the ends of the soft metal head 18 tend to axially compress the head and cause the intermediate portion of the head to radially expand. Since the ring 10 completely surrounds the soft metal head 18, it is apparent that outward expansion of the head, as tends to occur during use of such a tool, is confined by the ring. Moreover, since the concave side of the ring 10 faces inwardly, the radial expansion of the head during use more completely fills the recess to maintain the head firmly on the ring.

The hand grip 22 is preferably molded onto the ends of the strips 11 to firmly hold the strips in abutting face-to-face contact. The hand grip 22 may be conveniently formed of the same metal used to form the head and, as best shown in Figures 1 and 2, is provided with transverse flutes or grooves 23 in the external periphery thereof which provide an improved gripping surface.

As is apparent from Figure 1, the transversely arched intermediate portion 11a of the strips 11 tapers from a maximum adjacent the ring 10 to a minimum adjacent the inner end of the hand grip 22. The rod 14 extends from the juncture of the strips 11 with the head to a point inwardly of the end of the hand grip to reinforce the shank of the tool.

From the foregoing it is apparent that the striking tool can be easily and economically formed. Moreover, the metal strap is arranged to firmly retain the soft metal head thereon and to prevent expansion of the head as tends to occur during use. The rod 14 facilitates welding of the ends of the ring together and also extends into the shank of the tool to reinforce the same.

I claim:

1. A soft-headed hammer comprising a ring, a pair of metal strips formed integrally with the ends of the ring, said strips each having a longitudinally extending channel portion intermediate the side edges thereof and coplanar flat portions along opposite sides of the channel portion, said strips being disposed in opposing face-to-face relation with the flat portions on one strip abutting the flat portions on the other strip, a soft metal head mounted in said ring, said ring having an arched cross-section with the concave side thereof facing inwardly to define a recess for retaining the head thereon, a hand grip surrounding one end portion of said strips to thereby retain strips in abutting relation, and means rigidly securing said strips to each other adjacent said ring to prevent spreading of the ring as the soft metal head deforms during use.

2. A soft-headed hammer comprising an elongated strap having a longitudinal depression formed intermediate the side edges thereof and defining a longitudinal channel portion extending throughout the length thereof and flat coplanar flanges along opposite sides of the channel portion, said strap being bent intermediate its ends to form a ring and having straight end sections extending radially outwardly from the ring with the flanges along opposite sides thereof in face-to-face abutting relation, the channel portion of said ring facing inwardly to form an annular recess, a soft metal head disposed in said ring and filling said annular recess therein to be retained thereby on the ring, a metal hand grip surrounding the free ends of said end section to retain the same in abutting relation, and means rigidly joining the ends of said ring to prevent spreading of said ring as the soft metal head deforms during use.

3. The combination of claim 2 wherein said last mentioned means includes a rod welded to the ends of said ring and extending longitudinally between said end sections in the channel portions thereof to rigidify the same.

References Cited in the file of this patent

UNITED STATES PATENTS

| | | |
|---|---|---|
| 917,840 | Bird | Apr. 13, 1909 |
| 2,489,841 | Wyllie | Nov. 29, 1949 |

FOREIGN PATENTS

| | | |
|---|---|---|
| 119,992 | Australia | May 21, 1945 |
| 937,788 | France | Mar. 22, 1948 |